3,449,390
BENZYL, ALKYL ARSENIC ACIDS AND THE
PREPARATION THEREOF
Ronald E. Wietelmann and Lawrence S. Wittenbrook, Marysville, Ohio, assignors to The O. M. Scott & Sons Company, Marysville, Ohio, a corporation of Ohio
No Drawing. Filed Dec. 9, 1965, Ser. No. 512,790
Int. Cl. C07f 9/72; A01n 9/24
U.S. Cl. 260—442
8 Claims

ABSTRACT OF THE DISCLOSURE

Benzyl, alkyl arsenic acids and their salts, processes for preparing the foregoing and their use for controlling plant growth.

This invention relates to novel compounds having valuable herbicidal properties, to processes for their preparation, and to their use for controlling plant growth.

The novel compounds of this invention are aryl substituted benzylalkyl arsinic acids and their salts, which can be represented by the general formula:

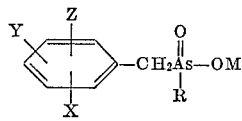

wherein X, Y and Z are radicals selected from the group consisting of hydrogen, halogen, alkyl having less than 5 carbon atoms, alkoxy having less than 5 carbon atoms, and nitro; R is an alkyl having less than 5 carbon atoms; and M is selected from the group consisting of hydrogen and alkali metals.

Preferred are the compounds of this invention wherein X is a radical selected from the group consisting of hydrogen, halogen, alkyl having less than 5 carbon atoms, alkoxy having less than 5 carbon atoms and nitro; Y and Z are hydrogen; R is an alkyl having less than 5 carbon atoms; and M is hydrogen or an alkali metal.

Still more preferred because of their outstanding activity as herbicides are the compounds of this invention wherein X is a para-substituted radical selected from the group consisting of hydrogen, halogen, alkyl having less than 5 carbon atoms, alkoxy having less than 5 carbon atoms and nitro; Y and Z are hydrogen; R is an alkyl having less than 5 carbon atoms; and M is hydrogen or an alkali metal.

Following are a number of the specific compounds of the invention. It is not intended that this be a complete listing of all the compounds of the invention, but that it merely be illustrative thereof.

Sodium benzylmethyl arsinate
Sodium-2-methylbenzylmethyl arsinate
Sodium-4-methylbenzylmethyl arsinate
Sodium-4-t-butylbenzylmethyl arsinate
Sodium-4-methoxybenzylmethyl arsinate
Sodium-2-nitrobenzylmethyl arsinate
Potassium-4-nitrobenzylmethyl arsinate
Sodium-4-fluorobenzylmethyl arsinate
Potassium-4-fluorobenzylmethyl arsinate
Potassium-4-chlorobenzylmethyl arsinate
Sodium-3,4-dimethylbenzylmethyl arsinate
Potassium-3,4-dimethylbenzylmethyl arsinate
Potassium-2,5-dimethylbenzylmethyl arsinate
Potassium-2,6-dichlorobenzylmethyl arsinate
Sodium-3,4-dichlorobenzylmethyl arsinate
Sodium-2,4-dichlorobenzylmethyl arsinate
Potassium-2,3,6-trichlorobenzylmethyl arsinate
Sodium-4-fluorobenzylbutyl arsinate
Sodium-4-chlorobenzylpropyl arsinate
Sodium-3,4-dichlorobenzylpropyl arsinate
Benzylmethyl arsinic acid
2-methylbenzylmethyl arsinic acid
4-methylbenzylmethyl arsinic acid
4-t-butylbenzylmethyl arsinic acid
4-methoxybenzylmethyl arsinic acid
2-nitrobenzylmethyl arsinic acid
4-nitrobenzylmethyl arsinic acid
4-fluorobenzylmethyl arsinic acid
4-chlorobenzylmethyl arsinic acid
3,4-dimethylbenzylmethyl arsinic acid
2,5-dimethylbenzylmethyl arsinic acid
2,6-dichlorobenzylmethyl arsinic acid
3,4-dichlorobenzylmethyl arsinic acid
2,4-dichlorobenzylmethyl arsinic acid
2,3,6-trichlorobenzylmethyl arsinic acid
4-fluorobenzylbutyl arsinic acid
4-chlorobenzylpropyl arsinic acid
3,4-dichlorobenzylpropyl arsinic acid One advantage of the compounds listed above is that, although they are very active, they have only a short residual. Also, they exhibit useful degrees of selectivity, in addition to being total herbicides as rates of application are varied, and effectiveness are both post- and pre-emergency controls.

The novel compounds of this invention can be prepared by reacting the appropriate alkylarsine oxide with an excess of aryl substituted benzyl chloride in aqueous, or partially aqueous, alkaline medium to give the pentavalent aryl substituted benzylalkyl arsinate in solution as shown by the following equation:

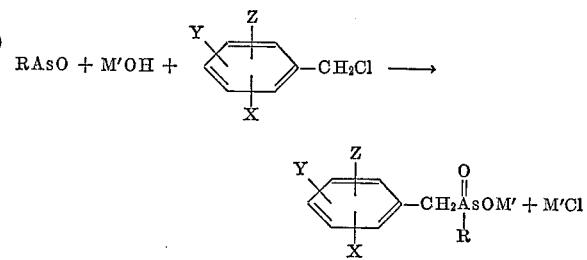

wherein X, Y, Z, and R, are as described above and M' is an alkali metal.

The benzylalkyl arsinic acid can be obtained from this solution by first extracting unreacted organic material from the aqueous portion with an organic solvent, preferably ethyl ether, then concentrating the aqueous portion and cooling and acidifying it with 6 normal HCl to a pH of 4 to 5. The acidification is shown in the following equation:

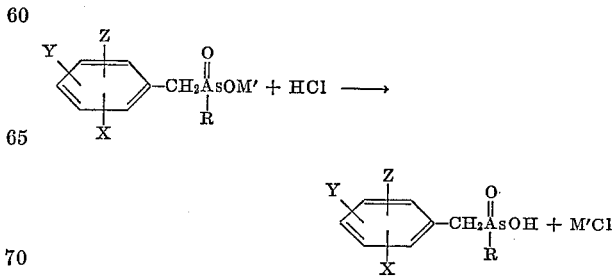

wherein X, Y, Z, R, and M' are as described previously.

The acid precipitates at this point as a white solid in most instances. Where the arsinic acid is water soluble and precipitation does not occur, the acidified solution is evaporated to dryness in vacuo and the solid residue extracted with boiling methanol. Evaporation of the methanol gives the solid arsinic acid, which may be further purified by recrystallization from an appropriate solvent.

The preparation of the novel compounds of this invention is illustrated in more detail by the following examples. Parts therein represent parts by weight. Temperatures are in degrees centigrade.

EXAMPLE 1

Preparation of sodium benzylmethyl arsinate

Sulfur doxide gas was bubbled into a stirred solution of 58 parts of disodium methylarsonate hexahydrate in 15 parts of water at room temperature for 1½ hours to produce methyl arsine oxide. (This reaction is exothermic and a significant decrease in temperature can be used as a guide to completion of the reaction.) The solution was then warmed to 60° and nitrogen gas bubbled into the solution for 2 hours to remove excess sulfur dioxide. While maintaining a nitrogen atmosphere in the system, 20 parts of sodium hydroxide in 15 parts of water and 49 parts of benzyl chloride were added to the above with stirring. The resulting mixture was heated to reflux and refluxed for 1 hour to give a solution of the previous unknown sodium benzylmethyl arsinate.

The sodium benzylmethyl arsinate can be purified by extraction with ethyl ether and concentration of the aqueous portion in vacuo. The procedure of this example can be used to prepare the compounds in the following table by substituting the listed aryl substituted benzyl chlorides for the benzyl chloride used above.

| Ex. No. | Aryl Substituted Benzyl Chloride | Parts by Weight | Sodium Aryl Substituted Benzylmethyl Arsinate |
|---|---|---|---|
| 2 | 2-methylbenzyl chloride | 42 | Sodium-2-methylbenzylmethyl arsinate. |
| 3 | 4-t-butylbenzyl chloride | 55 | Sodium-4-t-butylbenzylmethyl arsinate. |
| 4 | 2-nitrobenzyl chloride | 51 | Sodium-2-nitrobenzylmethyl arsinate. |
| 5 | 4-methoxybenzyl chloride | 47 | Sodium-4-methoxybenzylmethyl arsinate. |
| 6 | 4-fluorobenzyl chloride | 43 | Sodium-4-fluorobenzylmethyl arsinate. |
| 7 | 4-methylbenzyl chloride | 42 | Sodium-4-methylbenzylmethyl arsinate. |
| 8 | 3,4-dimethylbenzyl chloride | 46 | Sodium-3,4-dimethylbenzylmethyl arsinate. |
| 9 | 3,4-dichlorobenzyl chloride | 59 | Sodium-3,4-dichlorobenzylmethyl arsinate. |
| 10 | 2,4-dichlorobenzyl chloride | 59 | Sodium-2,4-dichlorobenzylmethyl arsinate. |

The procedure of Example 1 can be used to prepare the compounds in the following table by substituting 28 parts of potassium hydroxide for the sodium hydroxide used in Example 1 and the indicated aryl substituted benzyl chlorides for the benzyl chloride used in Example 1.

| Ex. No. | Aryl Substituted Benzyl Chloride | Parts by Weight | Potassium Aryl Substituted Benzylmethyl Arsinate |
|---|---|---|---|
| 11 | 4-nitrobenzyl chloride | 51 | Potassium-4-nitrobenzylmethyl arsinate. |
| 12 | 4-chlorobenzyl chloride | 48 | Potassium-4-chlorobenzylmethyl arsinate. |
| 13 | 4-fluorobenzyl chloride | 43 | Potassium-4-fluorobenzylmethyl arsinate. |
| 14 | 2,6-dichlorobenzyl chloride | 59 | Potassium-2,6-dichlorobenzylmethyl arsinate. |
| 15 | 2,3,6-trichlorobenzyl chloride | 69 | Potassium-2,3,6-trichlorobenzylmethyl arsinate. |
| 16 | 2,5-dimethylbenzyl chloride | 46 | Potassium-2,5-dimethylbenzylmethyl arsinate. |
| 17 | 3,4-dimethylbenzyl chloride | 46 | Potassium-3,4-dimethylbenzylmethyl arsinate. |

EXAMPLE 18

Preparation of sodium-4-fluorobenzylbutyl arsinate

One hundred seven (107) parts of butane arsonic acid was added to 39 parts of sodium hydroxide in 735 parts water. Sulfur dioxide gas was bubbled through the solution for two hours to produce butyl arsine oxide. (This reaction is exothermic and a significant decrease in temperature can be used as a guide to completion of the reaction.) The solution was warmed to 60° and nitrogen gas bubbled through the heated solution for 3½ hours. Forty-nine (49) parts of sodium hydroxide and 106 parts of 4-fluorobenzlychloride were added to the solution with vigorous stirring. The mixture was heated to reflux and refluxed 1¼ hours. A 10% sodium hydroxide solution was added to the reaction mass until a homogenous phase was obtained to give a solution of the previously unknown sodium-4-fluorobenzylbutyl arsinate. The product may be purified as hereinbefore described.

EXAMPLE 19

Preparation of sodium-3,4-dichlorobenzylpropyl arsinate

A solution of 49 parts of sodium hydroxide in 143 parts of a 1:1 mixture of water and 95% ethanol was added to 41 parts of propyl arsinoxide in 124 parts of ethanol. The reaction mass was heated to reflux and refluxed 19 hours under a nitrogen atmosphere to give a solution of the previously unknown sodium-3,4-dichlorobenzylpropyl arsinate. The product may be purified as hereinbefore described.

EXAMPLE 20

Preparation of sodium-4-chlorobenzylpropyl arsinate

Three hundred seventy-two (372) parts of propyl arsinoxide solution (0.145 mol propylarsinoxide/milliliter water), 123 parts of p-chlorobenzyl chloride, and 247 parts of 95% ethanol were added to 49 parts of sodium hydroxide in 153 parts of water. The mixture was stirred for 8 days at room temperature to give a solution of the previously unknown sodium-4-chlorobenzylpropyl arsinate. The product may be purified as hereinbefore described.

EXAMPLE 21

Preparation of 4-chlorobenzylmethyl arsinic acid

A solution of potassium-4-chlorobenzylmethyl arsinate (as prepared in Example 12) was acidified to a pH of 4 to 5 with a 6 normal solution of hydrochloric acid. The resulting white precipitate was then filtered, washed sparingly with water, and dried in vacuo to give the previously unknown 4-chlorobenzylmethyl arsinic acid. 4-chlorobenzylmethyl arsinic acid can be further purified by recrystallizing from ethanol to give white needles having a melting point of 162–164°.

4-chlorobenzylmethyl arsinic acid prepared as described in the preceding paragraph was found to have the following elemental analysis:

Calculated for $C_8H_{10}AsClO_2$: C, 38.60; H, 4.02; As, 30.13. Found: C, 38.46; H, 3.97; As, 29.97.

The aryl substituted benzylalkyl arsinic acids listed in the following table can be prepared by acidifying the appropriate alkali metal aryl substituted benzylalkyl arsinate by the procedure in Example 21.

| Ex. No. | Alkali metal aryl substituted benzylalkyl arsinate | Aryl substituted benzylalkyl arsinic acid |
|---|---|---|
| 22 | Sodium-2-methylbenzylmethyl arsinate. | 2-methylbenzylmethyl arsinic acid. |
| 23 | Sodium-4-t-butylbenzylemthyl arsinate. | 4-t-butylbenzylmethyl arsinic acid. |
| 24 | Sodium-2-nitrobenzylmethyl arsinate. | 2-nitrobenzylmethyl arsinic acid. |
| 25 | Sodium-4-methylbenzylmethyl arsinate. | 4-methylbenzylmethyl arsinic acid. |
| 26 | Sodium-4-fluorobenzylmethyl arsinate. | 4-fluorobenzylmethyl arsinic acid. |
| 27 | Sodium-4-methoxybenzyl-methyl arsinate. | 4-methoxybenzylmethyl arsinic acid. |
| 28 | Sodium-3,4-dichlorobenzyl methyl arsinate. | 3,4-dichlorobenzyl methyl arsinic acid. |
| 29 | Sodium-3,4-dimethylbenzyl methyl arsinate. | 3,4-dimethylbenzyl methyl arsinic acid. |
| 30 | Sodium-2,4-dichlorobenzyl methyl arsinate. | 2,4-dichlorobenzyl methyl arsinic acid. |
| 31 | Sodium benzylmethyl arsinate. | Benzylmethyl arsinic acid. |
| 32 | Potassium-4-nitrobenzyl methyl arsinate. | 4-nitrobenzylmethyl arsinic acid. |
| 33 | Potassium-2,6-dichlorobenzyl methyl arsinate. | 2,6-dichlorobenzyl methyl arsinic acid. |
| 34 | Potassium-2,3,6-trichloro-benzyl methyl arsinate. | 2,3,6-trichlorobenzyl methyl arsinic acid. |
| 35 | Potassium-2,5-dimethylbenzyl methyl arsinate. | 2,5-dimethylbenzyl methyl arsinic acid. |
| 36 | Sodium-4-fluorobenzylbutyl arsinate. | 4-fluorobenzylbutyl arsinic acid. |
| 37 | Sodium-3,4-dichlorobenzyl propyl arsinate. | 3,4-dichlorobenzyl propyl arsinic acid. |
| 38 | Sodium-4-chlorobenzylpropyl arsinate. | 4-chlorobenzylpropyl arsinic acid. |

The aryl substituted benzylalkyl arsinic acids listed above can be purified as hereinbefore described.

EXAMPLE 39

The purified aryl substituted benzylalkyl arsinic acids prepared in accord with the present invention and listed below were found to have the following elemental analyses and melting points:

the aryl substituted benzylalkyl arsinate in solution as shown by the following equation:

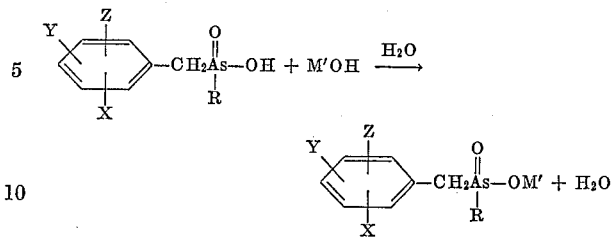

wherein X, Y, Z, R, and M' are as previously described. The aryl substituted benzylalkyl arsinate is obtained from this solution by filtration and evaporation to dryness. The foregoing process is illustrated in more detail by the following example.

EXAMPLE 40

Preparation of purified sodium-3,4-dichlorobenzylmethyl arsinate

A solution of 3.2 grams (.08 mol) of sodium hydroxide in 50 milliliters of water was slowly added to a mixture of 22.6 grams (.08 mol) of 3,4-dichlorobenzylmethyl arsinic acid in 100 milliliters of water and stirred until all the acid was dissolved. A small amount of residue, which did not go into solution, was filtered off. The water was evaporated from the filtrate and the remaining white product dried to give essentially pure sodium-3,4-dichlorobenzylmethyl arsinate.

Sodium-3,4-dichlorobenzylmethyl arsinate as prepared above was found to have the following elemental analysis:
Calculated for $C_8H_8O_2Cl_2AsNa \cdot H_2O$: As, 23.20. Found: As, 23.13.

| Compound | Empirical Formula | Element | Percent Calculated | Percent Found | M.P. (degs.) |
|---|---|---|---|---|---|
| 2-methylbenzylmethyl arsinic acid | $C_9H_{13}O_2As$ | C | 47.39 | 47.32 | 125 |
| | | H | 5.74 | 5.38 | |
| | | O | 14.03 | 14.86 | |
| | | As | 32.84 | 32.44 | |
| 4-t-butylbenzylmethyl arsinic acid | $C_{12}H_{19}O_2As$ | C | 53.34 | 53.31 | 206–209 |
| | | H | 7.09 | 7.15 | |
| | | As | 27.72 | 28.00 | |
| 2-nitrobenzylmethyl arsinic acid | $C_8H_{10}O_4NAs$ | C | 37.09 | 37.23 | 170 |
| | | H | 3.89 | 3.86 | |
| 4-fluorobenzylmethyl arsinic acid | $C_8H_{10}O_2FAs$ | C | 41.40 | 41.26 | 145–147 |
| | | H | 4.34 | 4.42 | |
| | | As | 32.28 | 32.67 | |
| 3,4-dichlorobenzylmethyl arsinic acid | $C_8H_9O_2Cl_2As$ | C | 33.95 | 33.60 | 169–171 |
| | | H | 3.21 | 3.20 | |
| | | As | 26.47 | 26.39 | |
| 3,4-dimethylbenzylmethyl arsinic acid | $C_{10}H_{15}O_2As$ | C | 49.60 | 49.64 | 172–173 |
| | | H | 6.24 | 6.16 | |
| 2,4-dichlorobenzylmethyl arsinic acid | $C_8H_9O_2Cl_2As$ | C | 33.95 | 33.62 | 143–145 |
| | | H | 3.21 | 3.10 | |
| | | As | 26.47 | 26.60 | |
| Benzylmethyl arsinic acid | $C_8H_{11}O_2As$ | C | 44.88 | 44.66 | 48–51 |
| | | H | 5.18 | 5.09 | |
| | | As | 34.99 | 34.58 | |
| 4-nitrobenzylmethyl arsinic acid | $C_8H_{10}O_4NAs$ | C | 37.09 | 37.14 | 176–179 |
| | | H | 3.89 | 3.66 | |
| | | As | 28.91 | 28.89 | |
| 2,6-dichlorobenzylmethyl arsinic acid | $C_8H_9O_2Cl_2As$ | C | 33.95 | 33.92 | 174–176 |
| | | H | 3.21 | 2.98 | |
| | | As | 26.47 | 26.56 | |
| 2,3,6-trichlorobenzylmethyl arsinic acid | $C_8H_8O_2Cl_3As$ | C | 30.03 | 30.00 | 178–181 |
| | | H | 2.54 | 2.54 | |
| | | O | 10.08 | 9.69 | |
| | | Cl | 33.51 | 33.85 | |
| | | As | 23.60 | 24.01 | |
| 2,5-dimethylbenzylmethyl arsinic acid | $C_{10}H_{15}O_2As$ | C | 49.60 | 49.50 | 158–160 |
| | | H | 6.24 | 6.39 | |
| | | As | 30.93 | 30.88 | |
| 4-fluorobenzylbutyl arsinic acid | $C_{11}H_{16}O_2FAs$ | C | 48.19 | 48.10 | 156–158.5 |
| | | H | 5.88 | 6.00 | |
| | | As | 27.32 | 27.66 | |
| 3,4-dichlorobenzylpropyl arsinic acid | $C_{10}H_{13}O_2Cl_2As$ | C | 38.62 | | 128–133 |
| | | As | 24.08 | 23.67 | |

If a purer aryl substituted benzylalkyl arsinate is desired than is obtainable from the process of Examples 1–20, the appropriate aryl substituted benzylalkyl arsinic acid can be combined with an alkali metal hydroxide to give As mentioned above, the compounds of the present invention have valuable herbicidal properties. In another aspect, therefore, the present invention resides in the provision of novel herbicidal compositions including these compounds. Herbicidal compositions of the present invention are prepared by admixing at least one aryl substituted benzylalkyl arsinic acid or aryl substituted benzylalkyl arsinate with pest control adjuvants or modifiers to provide compositions in the form of dusts, granules, solutions, water-dispersions or emulsions. Thus, aryl substituted benzylalkyl arsinic acids and aryl substituted benzylalkyl arsinates can be combined with a carrier or diluent, a surfactant or dispersing agent, a sticking or bonding agent, an emulsifying agent, a conditioning or flow enhancing agent, a dye, other pesticides, or any desired combination of these depending upon the particular application involved.

Examples of carriers or diluents which may be used are: water, kerosene, acetone, benzene, toluene, xylene, corncobs, vermiculite, clays, diatomaceous earth, talc, alumina-silica materials, and any other finely-divided extender.

A detailed list of surfactants, dispersing agents, and emulsifying agents suitable for use in the present invention can be found in copending application No. 271,465 filed Apr. 8, 1963, for Process and Product (now Patent No. 3,231,363), which is assigned to the assignee of the present invention and in "Detergents and Emulsifiers Annual 1965" by John W. McCutcheon Inc., 236 Mount Kemble Ave. Morristown, N.J., which are hereby incorporated herein by reference. The compositions of this invention may also contain a dye as mentioned above. Dyes are useful in providing a means of clearly distinguishing treated areas from untreated areas.

Examples of suitable sticking or bonding agents are the polyhydric alcohols such as the ethylene, propylene, dipropylene, triethylene and hexylene glycols, glycol ethers such as methyl Cellosolve and ketones of low volatility such as methyl ethyl ketone and diisobutylketone.

Examples of flow enhancing agents are: finely ground attapulgus clay, finely ground diatomaceous earth, synthetic precipitated hydrated silicon dioxide, and colloidal silica.

The following examples are illustrative of specific herbicidal compositions prepared in accord with the principles of the present invention and of the methods of their application.

EXAMPLE 41

A granular composition prepared according to the present invention and containing 4-chlorobenzylmethyl arsinic acid was applied with a lawn spreader to bentgrass (Agrostis spp) turf. Two applications of the composition, providing a total of 18 pounds of the active ingredient per acre, were employed. The composition had the following formula.

Ingredients: Parts by wt.
 4-chlorobenzylmethyl arsinic acid _____ 19
 Hexylene glycol (sticking agent) _____ 61
 Ultrawet K dense (surfactant) _____ 35
 Particulate vermiculite (carrier) _____ 500

The foregoing composition, applied in the manner described above, effected a 99% kill of the bentgrass turf.

EXAMPLE 42

A spray composition containing 4-fluorobenzylmethyl arsinic acid was applied with a pressure sprayer to tall fescue (Festuca elatior) at a rate providing 9 pounds per acre of the active ingredient. The composition had the following formula:

Ingredients: Parts by wt.
 4-fluorobenzylmethyl arsinic acid _____ 51
 Water _____ 50,000

The composition effected a 75% kill of the tall fescue.

EXAMPLE 43

A granular composition containing benzylmethyl arsinic acid was applied with a lawn spreader to bentgrass turf at a rate providing 18 pounds per acre of the active ingredient. The composition had the following formula:

Ingredients: Parts by wt.
 Benzylmethyl arsinic acid _____ 19
 Hexylene glycol _____ 61
 Ultrawet K dense _____ 35
 Vermiculite _____ 500

This composition effected a 100% kill of bentgrass turf.

EXAMPLE 44

Compounds of the present invention were incorporated into granular compositions and applied manually to flats sown with seeds of common Kentucky bluegrass (A), crabgrass (B), and annual bluegrass (C). Other flats similarly sown were left untreated as a comparative check. The compositions had the following formula:

Ingredients: Parts by wt.
 Sand _____ 50,000
 Surfactant _____ 73
 Solvent _____ 14,555–11,145
 Aryl substituted benzylalkyl arsinic
  acid or arsinate:
   1 lb./A _____ 5
   5 lb./A _____ 26

Twenty-one days after application, percentage of control of germination was calculated using seeds in untreated flats as standards. The results are tabulated below:

| Compound | Percent Control | | | | | |
| --- | --- | --- | --- | --- | --- | --- |
| | A | | B | | C | |
| | 1 lb./A [1] | 5 lb./A | 1 lb./A | 5 lb./A | 1 lb./A | 5 lb./A |
| 3,4-dimethylbenzylmethyl arsinic acid | 81 | 100 | 5 | 57 | 27 | 100 |
| 2,4-dichlorobenzylmethyl arsinic acid | 70 | 97 | 10 | 74 | 38 | 81 |
| 3,4-dichlorobenzylmethyl arsinic acid | 100 | 100 | 44 | 100 | 100 | 100 |
| Sodium-3,4-dichlorobenzylmethyl arsinate | 85 | 100 | 0 | 76 | 21 | 100 |
| 4-methylbenzylmethyl arsinic acid | 20 | 100 | 0 | 0 | 0 | 100 |
| 2,6-dichlorobenzylmethyl arsinic acid | 2 N | 53 | 2 N | 43 | 2 N | 25 |
| Benzylmethyl arsinic acid | 10 | 100 | 14 | 62 | 0 | 96 |
| 4-t-butylbenzylmethyl arsinic acid | 42 | 84 | 24 | 5 | 5 | 32 |
| 2-methylbenzylmethyl arsinic acid | 10 | 63 | 0 | 47 | 0 | 0 |
| 4-methoxybenzylmethyl arsinic acid | 0 | 95 | 0 | 38 | 0 | 77 |
| 4-fluorobenzylmethyl arsinic acid | 37 | 42 | 10 | 52 | 77 | 55 |
| 2,3,6-trichlorobenzylmethyl arsinic acid | 0 | 40 | 0 | 33 | 4 | 8 |

[1] lb./A=pounds per acre.
[2] N=Indicates no test.

The selectivity of representative compounds of the present invention is illustrated by the preceding table and in various ones of the following examples.

EXAMPLE 45

Compounds of the present invention were incorporated into granular compositions and applied manually to flats sown with seeds of clover (D), pigweed (E), and endive (F). Other flats similarly sown were left untreated as a comparative check. The compositions were of the same type as those of Example 44.

Twenty-one days after application, the percentage of control of germination (tabulated below) of seeds in treated flats was calculated using seeds in untreated flats as standards. The results are tabulated below:

|  | Percent Control | | | | | |
|---|---|---|---|---|---|---|
|  | D | | E | | F | |
| Compound | 1 lb./A [1] | 5 lb./A | 1 lb./A | 5 lb./A | 1 lb./A | 5 lb./A |
| 3,4-dimethylbenzyl methyl arsinic acid | 52 | 100 | 43 | 100 | 9 | 61 |
| 2,4-dichlorobenzyl methyl arsinic acid | 100 | 100 | 88 | 97 | 35 | 74 |
| 3,4-dichlorobenzylmethyl arsinic acid | 97 | 100 | 100 | 100 | 8 | 100 |

[1] lb./A=Pounds per acre.

EXAMPLE 46

Compounds of the present invention were incorporated into granular compositions and applied manually at the rate of 10 pounds per acre of active ingredient to flats sown with common Kentucky bluegrass (A), crabgrass (B), annual bluegrass (C), clover (D), pigweed (E), and endive (F). The granular compositions had the following formula:

|  | Parts by wt. |
|---|---|
| Sand | 5,000 |
| Surfactant | 7 |
| Solvent | 1,115–1,456 |
| Aryl substituted benzylalkyl arsinic acid or arsinate | 5 |

Percentage of control of germination (tabulated below) was determined in the same manner as in Example 44.

EXAMPLE 47

Compounds of the present invention were incorporated into spray compositions and applied with a sprayer to common Kentucky bluegrass (A), crabgrass (B), and annual bluegrass (C) when the first true leaves had appeared (approximately three weeks after sowing). Similar plants were left untreated as a comparative check. The spray compositions had the following formula:

| Ingredients: | Parts by wt. |
|---|---|
| Water | 50,000 |
| Surfactant | 193 |
| Solvent | 278–1641 |
| Aryl substituted benzylalkyl arsinic acid or arsinate | 14–68 |

Twenty-one days after application percentage of kill (tabulated below) was calculated using untreated plants as standards.

|  | Percent Kill | | | | | |
|---|---|---|---|---|---|---|
|  | A | | B | | C | |
| Compound | 1 lb./A [1] | 5 lb./A | 1 lb./A | 5 lb./A | 1 lb./A | 5 lb./A |
| 3,4-dimethylbenzylmethyl arsinic acid | 95 | 100 | 13 | 96 | 88 | 100 |
| 4-chlorobenzylpropyl arsinic acid | 3 | 5 | 11 | 16 | 0 | 0 |
| 2,4-dichlorobenzylmethyl arsinic acid | 78 | 100 | 37 | 100 | 57 | 100 |
| 3,4-dichlorobenzylmethyl arsinic acid | 100 | 100 | 80 | 100 | 100 | 100 |
| Sodium-3,4-dichlorobenzylmethyl arsinate | 100 | 100 | 88 | 100 | 100 | 100 |
| 4-methylbenzylmethyl arsinic acid | 98 | 100 | 21 | 100 | 100 | 100 |
| 3,4-dichlorobenzylpropyl arsinic acid | 7 | 8 | 7 | 38 | 3 | 49 |
| 4-chlorobenzylmethyl arsinic acid | 100 | 100 | 96 | 100 | 100 | 100 |
| 4-nitrobenzylmethyl arsinic acid | 25 | 38 | 47 | 72 | 28 | 4 |
| 4-fluorobenzylmethyl arsinic aicd | 100 | 100 | 95 | 100 | 100 | 100 |
| 2,6-dichlorobenzylmethyl arsinic acid | 56 | 100 | 53 | 100 | 39 | 100 |
| Benzylmethyl arsinic acid | 100 | 100 | 53 | 100 | 98 | 100 |
| 4-t-butylbenzylmethyl arsinic acid | 21 | 64 | 2 | 39 | 2 | 20 |
| 2-methylbenzylmethyl arsinic acid | 98 | 100 | 72 | 100 | 46 | 100 |
| 4-methoxybenzylmethyl arsinic acid | 94 | 100 | 47 | 76 | 100 | 100 |
| 4-fluorobenzylbutyl arsinic acid | 64 | 97 | 38 | 95 | 59 | 100 |
| 2,3,6-trichlorobenzylmethyl arsinic acid | 39 | 31 | 35 | 91 | 16 | 57 |

[1] lb./A=Pounds per acre.

|  | Percent Control | | | | | |
|---|---|---|---|---|---|---|
| Compound | A | B | C | D | E | F |
| 3,4-dimethylbenzylmethyl arsinic acid | 100 | 100 | 100 | 100 | 100 | 100 |
| 4-chlorobenzylpropyl arsinic acid | 26 | 12 | 23 | 0 | 0 | 0 |
| 2,4-dichlorobenzylmethyl arsinic acid | 100 | 100 | 100 | 100 | 100 | 100 |
| 4-methylbenzylmethyl arsinic acid | 100 | 86 | 100 | 100 | 100 | 100 |
| 3,4-dichlorobenzylpropyl arsinic acid | 59 | 36 | 69 | 95 | 95 | 27 |
| 4-chlorobenzylmethyl arsinic acid | 100 | 100 | 100 | 100 | 100 | 100 |
| 4-nitrobenzylmethyl arsinic acid | 16 | 84 | 4 | 79 | 17 | 91 |
| 4-fluorobenzylmethyl arsinic acid | 100 | 100 | 100 | 100 | 100 | 100 |
| 2,6-dichlorobenzylmethyl arsinic acid | 100 | 100 | 100 | 100 | 100 | 100 |
| Benzylmethyl arsinic acid | 100 | 100 | 100 | 100 | 100 | 100 |
| 4-t-butylbenzylmethyl arsinic acid | 100 | 74 | 100 | 100 | 100 | 79 |
| 2-methylbenzylmethyl arsinic acid | 100 | 95 | 100 | 100 | 100 | 100 |
| 4-methoxybenzylmethyl arsinic acid | 100 | 95 | 100 | 100 | 100 | 100 |
| 4-fluorobenyzlbutyl arsinic acid | 100 | 100 | 100 | 100 | 100 | 100 |
| 2,3,6-trichlorobenzylmethyl arsinic acid | 100 | 76 | 86 | 100 | 100 | 100 |

The foregoing examples establish that the compounds of the present invention have pre-emergence as well as post-emergence herbicidal activity.

EXAMPLE 48

Compounds of the present invention were incorporated into spray compositions and applied with a sprayer to clover (D), pigweed (E), and endive (F) when the first true leaves had appeared (approximately three weeks after sowing). Similar plants were left untreated as a comparative check. Twenty-one days after application, percentage or kill (tabulated below) was calculated using untreated plants as standards. The spray compositions had the same formula as was given in Example 47.

| | Percent Kill | | | | | |
|---|---|---|---|---|---|---|
| | D | | E | | F | |
| Compound | 1 lb./A [1] | 5 lb./A | 1 lb./A | 5 lb./A | 1 lb./A | 5 lb./A |
| 3,4-dimethylbenzylmethyl arsinic acid | 100 | 100 | 100 | 100 | 59 | 100 |
| 4-chlorobenzylpropyl arsinic aicd | 3 | 12 | 5 | 65 | 0 | 0 |
| 2,4-dichlorobenzylmethyl arsinic aicd | 100 | 100 | 91 | 100 | 95 | 100 |
| 3,4-dichlorobenzylmethyl arsinic acid | 100 | 100 | 100 | 100 | 95 | 100 |
| Sodium-3,4-dichlorobenzylmethyl arsinate | 100 | 100 | 100 | 100 | 100 | 100 |
| 4-methylbenzyl ethyl arsinic acid | 100 | 100 | 100 | 100 | 96 | 100 |
| 3,4-dichlorobenzylpropyl arsinic acid | 4 | 77 | 62 | 96 | 26 | 16 |
| 4-chlorobenzylmethyl arsinic acid | 100 | 100 | 100 | 100 | 100 | 100 |
| 4-nitrobenzylmethyl arsinic acid | 43 | 69 | 11 | 71 | 47 | 88 |
| 4-fluorobenzylmethyl arsinic acid | 100 | 100 | 100 | 100 | 100 | 100 |
| 2,6-dichlorobenzylmethyl arsinic acid | 100 | 100 | 97 | 100 | 96 | 100 |
| Benzylmethyl arsinic acid | 100 | 100 | 100 | 100 | 56 | 100 |
| 4-t-butylbenzylmethyl arsinic acid | N [2] | N [2] | 88 | 100 | N [2] | N [2] |
| 2-methylbenzylmethyl arsinic acid | 100 | 100 | 100 | 100 | 96 | 100 |
| 4-methoxybenzylmethyl arsinic acid | 100 | 100 | 70 | 100 | 94 | 100 |
| 4-fluorobenzylbutyl arsinic acid | 100 | 100 | 100 | 100 | 100 | 100 |
| 2,3,6-trichlorobenzylmethyl arsinic acid | 78 | 97 | 97 | 100 | N [2] | N [2] |

[1] lb./A=Pounds per acre.
[2] N=Indicates no test.

EXAMPLE 49

Compounds of the present invention were incorporated into spray compositions and applied with a sprayer to common Kentucky bluegrass (A), crabgrass (B), annual bluegrass (C), clover (D), pigweed (E), and endive (F) when the first true leaves had appeared (approximately three weeks after sowing). Similar plants were left untreated as a comparative check. The spray compositions had the following formula:

| Ingredients: | Parts by wt. |
|---|---|
| Water | 50,000 |
| Surfactant | 193 |
| Solvent | 136–414 |
| Aryl substituted benzylalkyl arsinic acid | 1–7 |

Twenty-one days after application, percentage of kill (tabulated below) was calculated using untreated plants as standards.

sprayer and spreader to mature sod of timothy (G), wheat (H), sundangrass (I), redtop (F), and K-31 fescue (K). Similar sod was left untreated as a comparative check.

Spray compositions had the following formula:

| Ingredients: | Parts by wt. |
|---|---|
| Water | 50,000 |
| Surfactant | 193 |
| Solvent | 278–5,728 |
| Aryl substituted benzylakyl arsinic acid or arsinate | 103–205 |

Granular compositions had the following formula:

| Ingredients: | Parts by wt. |
|---|---|
| Sand | 5,000 |
| Surfactant | 7 |
| Solvent | 1,120–1,456 |
| Aryl substituted benzylakyl arsinic acid or arsinate | 5–10 |

| | | Percent Kill | | | | | |
|---|---|---|---|---|---|---|---|
| Compound | Rate, lbs./A [1] | A | B | C | D | E | F |
| 2,4-dichlorobenzylmethyl arsininic acid | 0.1 | 0 | 5 | 5 | 4 | 45 | 2 |
| | 0.5 | 26 | 17 | 29 | 53 | 100 | 24 |
| 3,4-dichlorobenzylmethyl arsinic acid | 0.1 | 12 | 9 | 2 | 13 | 7 | 0 |
| | 0.5 | 95 | 48 | 92 | 100 | 100 | 36 |

[1] lb./A=Pounds per care.

EXAMPLE 50

Compounds of the present invention were incorporated into spray and granular compositions and applied by Twenty-eight days after application, percentage of kill (tabulated below) was calculated using untreated plants as standards.

| | | | Percent Kill | | | | |
|---|---|---|---|---|---|---|---|
| Compound | Application | Rate, lbs./A [c] | G | H | I | J | K |
| 3,4-dimethylbenzylmethyl arsinic acid | S [a] | 10 | 100 | 97 | 100 | 100 | 100 |
| | G [b] | 10 | 87 | 58 | 60 | 40 | 45 |
| | G | 20 | 100 | 88 | 78 | 93 | 86 |
| 2,4-dichlorobenzylmethyl arsinic acid | S | 10 | 100 | 97 | 100 | 89 | 54 |
| | G | 10 | 57 | 49 | 46 | 7 | 9 |
| | G | 20 | 90 | 83 | 92 | 54 | 14 |
| 3,4-dichlorobenzylmethyl arsinic acid | S | 10 | 100 | 100 | 94 | 100 | 100 |
| | G | 10 | 100 | 92 | 83 | 91 | 72 |
| | G | 20 | 100 | 95 | 93 | 100 | 90 |
| Sodium-3,4-dichlorobenzylmethyl arsinate | S | 10 | 100 | 100 | 100 | 96 | 100 |
| | G | 10 | 100 | 94 | 33 | 63 | 55 |
| | G | 20 | 100 | 96 | 86 | 95 | 71 |
| 4-methylbenzylmethyl arsinic acid | S | 20 | 100 | 94 | 83 | 97 | 94 |
| | G | 10 | 40 | 32 | 45 | 38 | 55 |
| | G | 20 | 100 | 72 | 51 | 91 | 57 |

[a] S Indicates spray composition.
[b] G Indicates granular composition.
[c] lb./A=Pounds per acre.

The following examples illustrate the methods of preparing the formulations referred to in Examples 41–50:

EXAMPLE 51

Granular composition of Example 41

Thirty (30) milliliters of hexylene glycol and 16 grams of alkyl benzene sodium sulfonate were blended with 8.43 grams of 100% pure 4-chlorobenzylmethyl arsinic acid until a suspension was formed. The resulting suspension was sprayed onto 100 cu. in. of No. 4 expanded vermiculite to form a granular, dust-free composition.

EXAMPLE 52

Granular composition of Example 44

10.4 milligrams of 3,4-dimethylbenzylmethyl arsinic acid, 2 drops of polyoxyethylene sorbitan monolaurate (currently available as "Tween 20" from Atlas Chemical Industries) and 4 drops of denatured alcohol (currently available as "Synasol" from Union Carbide Chemical Company) were thoroughly mixed together with a micro mortar and pestle. This mixture was added to 28 milliliters of Synasol, which was stirred into 100 grams of sand. The sand was stirred frequently at room temperature until dry.

EXAMPLE 53

Spray composition of Example 47

Fifty-two (52) milligrams of 4-fluorobenzylbutyl arsinic acid, 2 drops of polyoxyethylene sorbitan monolaurate (currently available as "Tween 20" from Atlas Chemical Industries) and 4 drops of denatured alcohol (currently available as "Synasol" from Union Carbide Chemical Company) were throughly mixed together with a micro mortar and pestle. This mixture was added to 1 milliliter of 1,4-dioxane and stirred until dissolved. The solution was diluted with 48 milliliters of water and applied as a spray.

Other of the formulations described herein may of course be similarly formulated.

As will be obvious to those skilled in the arts to which this invention relates, the proportions of the ingredients in the various formulations disclosed herein may be varied for various applications of the present invention. The following table lists the preferred proportions of ingredients for the various types of these formulations:

Spray compositions

| Ingredients: | Range (parts by wt.) |
| --- | --- |
| Carrier | 50,000 |
| Surfactant | 0–193 |
| Solvent [1] | 0–5728 |
| Aryl substituted benzylmethyl arsinic acid or arsinate | 1–205 |

Granular compositions

| | |
| --- | --- |
| Carrier | 5,000 |
| Surfactant | 7–350 |
| Solvent [1] | 610–1456 |
| Aryl substituted benzylmethyl arsinic acid or arsinate | 0.5–190 |

[1] The "solvent" may include or be a sticking agent such as ethylene or hexylene glycol or another of the sticking agents listed above or those disclosed in U.S. Patents Nos. 3,076,699 and 3,083,089, which are hereby incorporated by reference in this application.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A compound having the formula

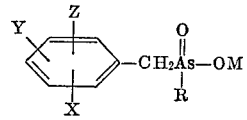

wherein X, Y, and Z are selected from the group consisting of hydrogen, halogen, alkyl having less than five carbon atoms, alkoxy having less than five carbon atoms, and nitro; R is an alkyl having less than five carbon atoms; and M is selected from the group consisting of hydrogen and the alkali metals.

2. The compound of claim 1, wherein Y and Z are hydrogen.

3. The compound of claim 2, wherein X is para-substituted.

4. The process of producing an arsinate having the formula

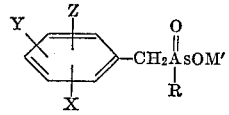

wherein X, Y, and Z are selected from the group consisting of hydrogen, halogen, alkyl having less than five carbon atoms, alkoxy having less than five carbon atoms, and nitro; R is an alkyl having less than five carbon atoms; and M' is selected from the group consisting of the alkali metals, comprising the step of reacting an alkylarsine oxide having the formula RAsO wherein R is an alkyl having less than five carbon atoms with an aryl substituted benzyl chloride having the formula

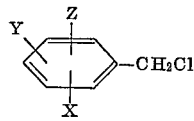

wherein X, Y, and Z are selected from the group consisting of hydrogen, halogen, alkyl having less than five carbon atoms, alkoxy having less than five carbon atoms, and nitro, said reaction being carried out in an alkaline medium.

5. The process of claim 4, wherein said reaction is carried out in an at least partially aqueous medium.

6. The process of claim 4, together with the step of acidifying said compound to convert it to an arsinic acid having the formula

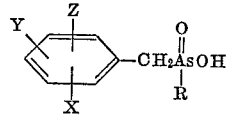

wherein X, Y, Z, and R are as aforesaid.

7. The process of claim 6, wherein the acidified solution is evaporated in vacuo and the residue extracted with methanol to separate the arsinic acid.

8. The process of producing an arsinate having the formula

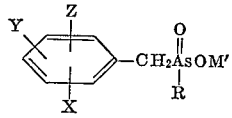

wherein X, Y, and Z are selected from the group consisting of hydrogen, halogen, alkyl having less than five carbon atoms, alkoxy having less than five carbon atoms, and nitro; R is an alkyl having less than five carbon atoms, and M' is selected from the group consisting of the alkali metals, comprising the step reacting an arsinic acid having the formula

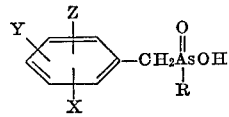

wherein X, Y, and Z are as aforesaid with a compound having the formula M'OH wherein M' is selected from the group consisting of the alkali metals.

References Cited

UNITED STATES PATENTS

| | | | |
|---|---|---|---|
| 1,061,587 | 5/1913 | Bart | 260—442 |
| 2,312,207 | 2/1943 | Clayton et al. | 260—442 X |
| 2,442,372 | 6/1948 | Miller et al. | 260—442 |
| 3,173,937 | 3/1965 | Moyerman et al. | 260—442 |

TOBIAS E. LEVOW, *Primary Examiner.*

W. F. W. BELLAMY, *Assistant Examiner.*

U.S. Cl X.R.

71—97

UNITED STATES PATENT OFFICE
CERTIFICATE OF CORRECTION

Patent No. 3,449,390

June 10, 1969

Ronald E. Wietelmann et al.

It is certified that error appears in the above identified patent and that said Letters Patent are hereby corrected as shown below:

Column 3, in the second table, third column, line 6, cancel "69". Columns 9 and 10, first table, footnote thereof, "b./A=" should read -- lb./A= --; second table, first column, line 10 thereof, "aicd" should read -- acid --; same column 10, line 73, "or" should read -- of --. Columns 11 and 12, in the first table, first column, line 6 thereof, "4-methylbenzylethyl" should read -- 4-methylbenzylmethyl --; same table, first column, line 7 thereof, "arsin C" should read -- arsinic --; same table, first column, line 12 thereof, "BenZylmethyl" should read -- Benzylmethyl --; same columns 11 and 12, in the second table, first column, line 1 thereof, "arsininic" should read -- arsinic --; same table, in the footnote, "care" should read -- acre --. Column 12, line 23, "sundangrass" should read -- sudangrass --; lines 31 and 39, "benzylakyl", each occurrence, should read -- benzylalkyl --. Column 13, line 38, "48" should read -- 38 --.

Signed and sealed this 21st day of April 1970.

(SEAL)
Attest:

EDWARD M. FLETCHER, JR.
Attesting Officer

WILLIAM E. SCHUYLER, JR.
Commissioner of Patents